United States Patent
Miyamoto et al.

(10) Patent No.: US 11,731,483 B2
(45) Date of Patent: Aug. 22, 2023

(54) TEMPERATURE ADJUSTMENT CIRCUIT

(71) Applicant: HONDA MOTOR CO., LTD., Tokyo (JP)

(72) Inventors: Tetsu Miyamoto, Saitama (JP); Toshikatsu Katagiri, Saitama (JP); Kengo Aoki, Saitama (JP); Naoki Fujihara, Saitama (JP); Ayumu Uno, Tokyo (JP); Kenta Sugitate, Saitama (JP); Takeshi Otani, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 17/416,788

(22) PCT Filed: Dec. 21, 2018

(86) PCT No.: PCT/JP2018/047373
§ 371 (c)(1),
(2) Date: Jun. 21, 2021

(87) PCT Pub. No.: WO2020/129257
PCT Pub. Date: Jun. 25, 2020

(65) Prior Publication Data
US 2022/0063368 A1 Mar. 3, 2022

(51) Int. Cl.
*F25D 17/02* (2006.01)
*B60H 1/00* (2006.01)
*B60L 58/26* (2019.01)

(52) U.S. Cl.
CPC ..... *B60H 1/00278* (2013.01); *B60H 1/00885* (2013.01); *B60L 58/26* (2019.02)

(58) Field of Classification Search
CPC ............ B60H 1/00278; B60H 1/00885; B60L 58/26
USPC .......................................................... 62/185
See application file for complete search history.

(56) References Cited

U.S. PATENT DOCUMENTS

2013/0140001 A1    6/2013  Mandl
2019/0375270 A1*  12/2019  Boger ................ B60H 1/00392

FOREIGN PATENT DOCUMENTS

| JP | 2004-076603 A | 3/2004 |
| JP | 2013-188098 A | 9/2013 |
| JP | 2013-254725 A | 12/2013 |

OTHER PUBLICATIONS

Mar. 12, 2019, International Search Report issued for related PCT Application No. PCT/JP2018/047373.
Mar. 12, 2019, International Search Opinion issued for related PCT Application No. PCT/JP2018/047373.

* cited by examiner

*Primary Examiner* — Davis D Hwu
(74) *Attorney, Agent, or Firm* — Paratus Law Group, PLLC

(57) ABSTRACT

A temperature adjustment circuit includes a first temperature adjustment circuit and a second temperature adjustment circuit in which a control device is configured to switch between a circulation state where a heat-transfer medium is circulated through a connection circuit in which the first temperature adjustment circuit and the second temperature adjustment circuit are connected to each other and a non-circulation state where the heat-transfer medium is not circulated through the connection circuit.

9 Claims, 5 Drawing Sheets

TEMPERATURE ADJUSTMENT CIRCUIT

CROSS REFERENCE TO PRIOR APPLICATION

This application is a National Stage Patent Application of PCT International Patent Application No. PCT/JP2018/047373 (filed on Dec. 21, 2018) under 35 U.S.C. § 371, which is hereby incorporated by reference in its entirety.

TECHNICAL FIELD

The present invention relates to a temperature adjustment circuit that performs temperature adjustment for a battery or the like.

BACKGROUND ART

There has been known a temperature adjustment circuit for an electric vehicle that includes: a first temperature adjustment circuit; a second temperature adjustment circuit; a pump that causes a heat-transfer medium to circulate in at least one of the first temperature adjustment circuit and the second temperature adjustment circuit; a connection path that connects the first temperature adjustment circuit and the second temperature adjustment circuit to form a connection circuit; and a switching unit that is capable of toggling between a circulation state where the heat-transfer medium is circulated through the connection circuit and a non-circulation state where the heat-transfer medium is not circulated through the connection circuit.

For example, Patent Literature 1 discloses a temperature adjustment circuit that includes: a cooling circuit that cools a battery; a cooling circuit that cools an inverter; a first refrigerant pump that is provided in the cooling circuit for cooling the battery; a second refrigerant pump that is provided in the cooling circuit for cooling the inverter; and a switching valve that switches between a state where a temperature of the battery and a temperature of the inverter are adjusted in a single circuit (hereinafter, also referred to as a circulation state) and a state where the temperature of the battery and the temperature of the inverter are adjusted in separate circuits (hereinafter, also referred to as a non-circulation state). Patent Literature 1 discloses that, in the temperature adjustment circuit, when an outside air temperature is lower than a predetermined temperature, the circulation state is established, and when the outside air temperature is equal to or higher than the predetermined temperature, the non-circulation state is established, thereby improving accuracy of temperature adjustment.

CITATION LIST

Patent Literature

Patent Literature 1: JP2013-188098A

SUMMARY OF INVENTION

Technical Problem

However, in the temperature adjustment circuit disclosed in Patent Literature 1, switching between the circulation state and the non-circulation state is performed using a four-way valve, but it is not easy to appropriately control the four-way valve. In addition, since the two circuits are made independent of each other by the four-way valve in the non-circulation state, it is necessary to provide a buffer tank (reserve tank) in each of the circuits. Although it is disclosed that an equivalent circuit may be constructed by using a three-way valve in Patent Literature 1, a specific example is not given.

The present invention provides a temperature adjustment circuit capable of easy switching between a circulation state and a non-circulation state and capable of reducing the number of buffer tanks required.

Solution to Problem

A temperature adjustment circuit according to the present invention includes:
  a first temperature adjustment circuit that includes:
    a first pump that is configured to supply a heat-transfer medium to a first cooling target and
    a first heat exchanging part that transfers heat between the heat-transfer medium and an air-conditioning refrigerant;
  a second temperature adjustment circuit that includes:
    a second pump that is configured to supply the heat-transfer medium to a second cooling target and
    a second heat exchanging part that transfers heat between the heat-transfer medium and outside air;
  a first connection path that connects a first connection portion of the first temperature adjustment circuit and a first connection portion of the second temperature adjustment circuit;
  a second connection path that connects a second connection portion of the first temperature adjustment circuit and a second connection portion of the second temperature adjustment circuit;
  a three-way valve that is provided in the first connection portion of the second temperature adjustment circuit and is configured to switch between supply of the heat-transfer medium to the second connection portion of the second temperature adjustment circuit and supply of the heat-transfer medium to the first connection path;
  a shut-off valve that is provided between the first connection portion of the first temperature adjustment circuit and the second connection portion of the first temperature adjustment circuit; and
  a control device that is configured to control the three-way valve and the shut-off valve,
  in which the control device is configured to switch between
    a circulation state where the shut-off valve is set to a valve-closed state and the three-way valve is controlled to supply the heat-transfer medium to the first connection path so that the heat-transfer medium is circulated through a connection circuit in which the first temperature adjustment circuit and the second temperature adjustment circuit are connected to each other and
    a non-circulation state where the shut-off valve is set to a valve-open state and the three-way valve is controlled to supply the heat-transfer medium to the second connection portion of the second temperature adjustment circuit so that the heat-transfer medium is not circulated through the connection circuit.

Advantageous Effects of Invention

According, to the present invention, by controlling the three-way valve and the shut-off valve to switch between the circulation state and the non-circulation state, easy switching of the temperature adjustment circuit can be achieved. In addition, since the first temperature adjustment circuit and the second temperature adjustment circuit are connected by the second connection path regardless of the circulation state or the non-circulation state, even if the heat-transfer medium expands, it is sufficient that one buffer tank is provided in the temperature adjustment circuit, so that it is possible to reduce the number of components.

DESCRIPTION OF EMBODIMENTS

Hereinafter, an embodiment of the present invention will be described with reference to FIGS. 1 to 4.

[Temperature Adjustment Circuit]

Figure 1:
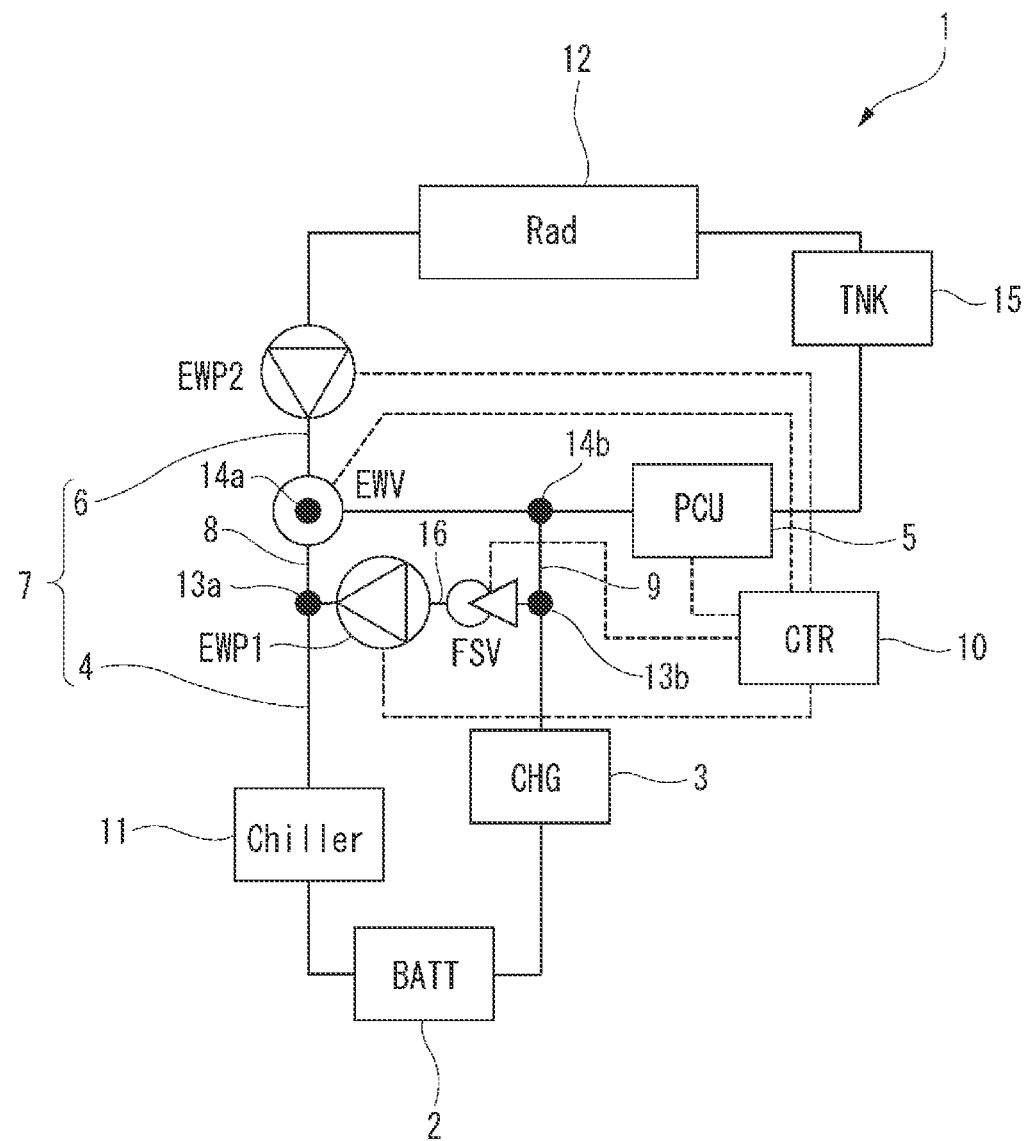
FIG. 1 is a circuit diagram illustrating a configuration of a temperature adjustment circuit according to an embodiment of the present invention.

As illustrated in FIG. 1, a temperature adjustment circuit 1 for an electric vehicle includes: a first temperature adjustment circuit 4 that transfers heat with a battery 2 and a charger 3; a second temperature adjustment circuit 6 that transfers heat with a power conversion device 5 that is configured to supply power to a motor 105 (see FIG. 5); connection paths 8 and 9 that are configured to connect the first temperature adjustment circuit 4 and the second temperature adjustment circuit 6 to form a connection circuit 7; an electrically-actuated three-way valve EWV that is capable of switching between a series mode (circulation state) where a heat-transfer medium circulates through the connection circuit 7 and a separate mode (non-circulation state) where the heat-transfer medium does not circulate through the connection circuit 7 but circulates through separate temperature adjustment circuits 4 and 6; and a control device 10 that controls the electrically-actuated three-way valve EWV, an electrically-actuated valve FSV to be described later, and the like. The heat-transfer medium is a liquid medium such as water, radiator fluid, or coolant.

[First Temperature Adjustment Circuit]

The first temperature adjustment circuit 4 includes: a first pump EWP1 that is configured to cause a heat-transfer medium to circulate in the circuit; a chiller 11 that is disposed downstream of the first pump EWP1 and transfers heat using an air-conditioning circuit of the electric vehicle; a battery 2 and a charger 3 that are disposed downstream of the chiller 11; and an electrically-actuated valve FSV that is disposed downstream of the charger 3 and upstream of the first pump EWP1.

Figure 2:
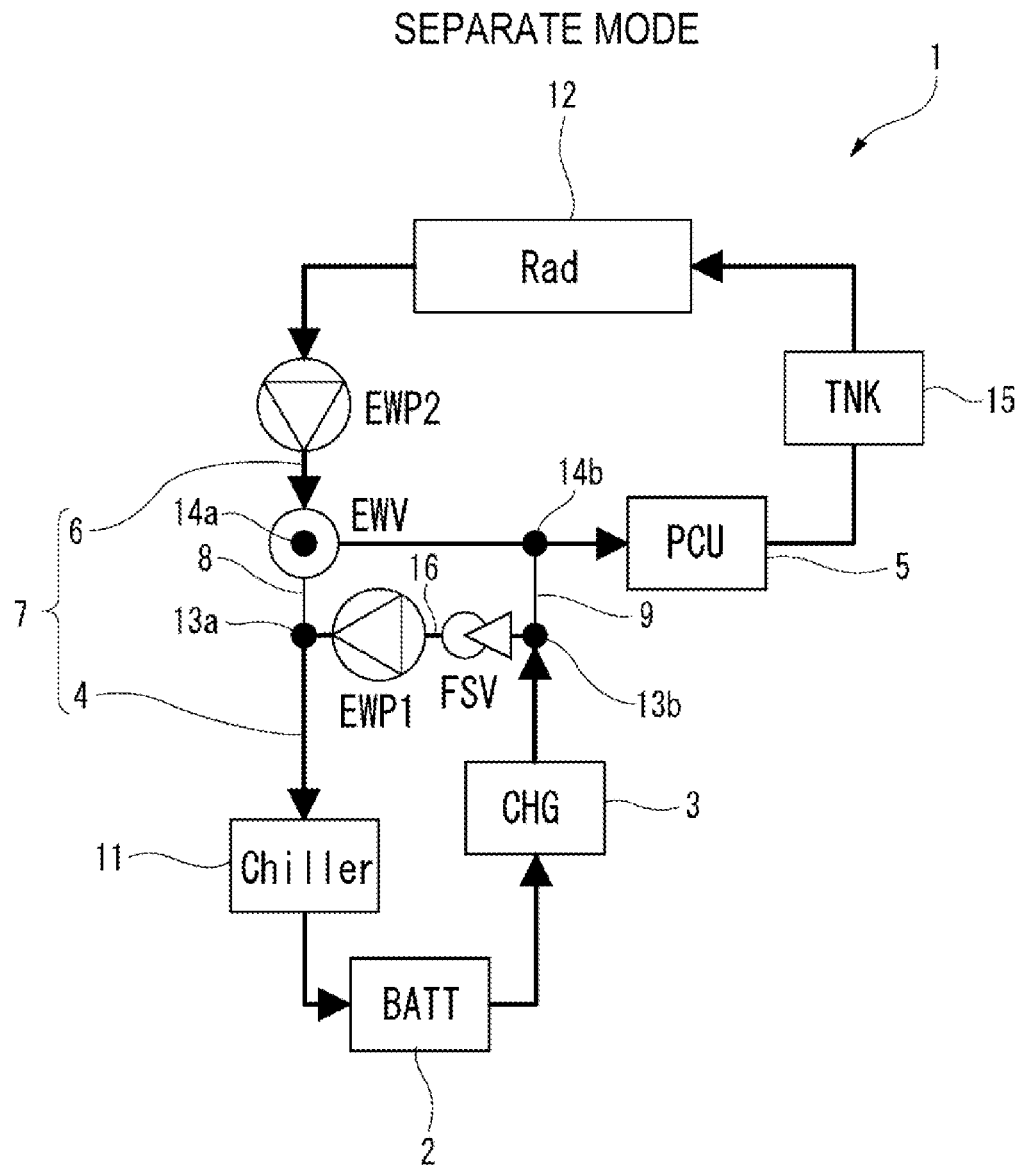
FIG. 2 is an illustrative diagram illustrating a flow of a heat-transfer medium in a separate mode in the temperature adjustment circuit of FIG. 1.

As illustrated in FIG. 2, in the separate mode, by driving the first pump EWP1 in a valve-open state of the electrically-actuated valve FSV, the heat-transfer medium discharged from the first pump EWP1 can be circulated in the order of the chiller 11, the battery 2, and the charger 3. Accordingly, the heat-transfer medium cooled by the chiller 11 transfers heat with the battery 2 and the charger 3 without being affected by heat of the first pump EWP1, so that the battery 2 and the charger 3 are appropriately cooled. In addition, since the battery 2 and the charger 3 can be cooled simultaneously, the battery 2 and the charger 3 that generate heat during charging can be efficiently cooled. Moreover, the battery 2 and the charger 3 can be disposed close to each other, so that a cooling pipe can be shortened.

[Second Temperature Adjustment Circuit]

The second temperature adjustment circuit 6 includes: a second pump EWP2 that is configured to cause the heat-transfer medium to circulate in the circuit; an electrically-actuated three-way valve EWV that is disposed downstream of the second pump EWP2 and is configured to switch between the separate mode and the series mode; a power conversion device 5 that is disposed downstream of the electrically-actuated three-way valve EWV; a buffer tank 15 that is disposed downstream of the power conversion device 5; and a radiator 12 that is disposed downstream of the buffer tank 15 and cools the heat-transfer medium. The power conversion device 5 includes at least one of an inverter that converts DC power into AC power and converts AC power into DC power, and a DC-to-DC converter that steps up or down a DC voltage.

Figure 4:
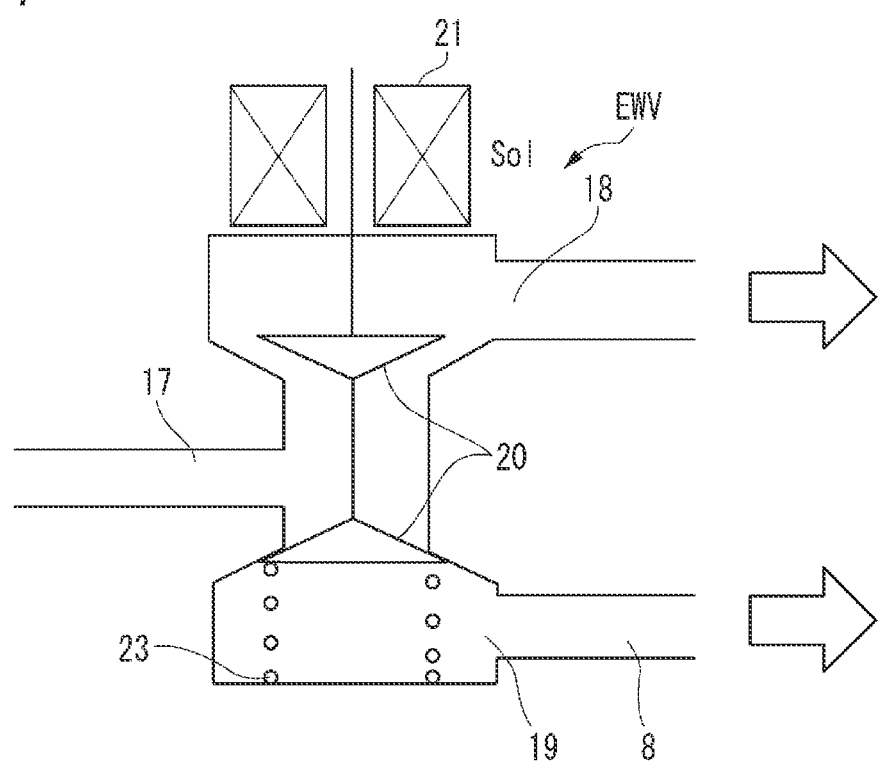
FIG. 4 is an illustrative diagram illustrating a schematic configuration of an electrically-actuated three-way valve included in the temperature adjustment circuit of FIG. 1.

As illustrated in FIG. 4, the electrically-actuated three-way valve EWV of the present embodiment is an electrically-actuated three-way valve and is provided in a first connection portion 14a of the second temperature adjustment circuit 6. The electrically-actuated three-way valve EWV includes a first port 17 that is connected to a downstream side of the second pump EWP2, a second port 18 that is connected to an upstream side of the power conversion device 5, a third port 19 that is connected to a side of a first connection path 8 to be described later, a valve body 20 that is a movable body that is configured to switches a flow path, a spring 23 that is configured to bias the valve body 20 to a first position (a position in FIG. 4), and an electromagnet 21 that is configured to switch a position of the valve body 20 to a second position against a biasing force of the spring 23.

In the separate mode, the electromagnet 21 of the electrically-actuated three-way valve EWV is not energized, so that the valve body 20 is located at the first position. At this time, the electrically-actuated three-way valve EWV allows connection between a downstream-side flow path (the first port 17) of the second pump EWP2 and an upstream-side flow path (the second port 18) of the power conversion device 5 and shuts off connection between the downstream-side flow path (the first port 17) of the second pump EWP2 and the first connection path 8 (the third port 19) to be described later. In the separate mode, as illustrated in FIG. 2, by driving the second pump EWP2, the heat-transfer medium discharged from the second pump EWP2 can be circulated through the power conversion device 5, the buffer tank 15, and the radiator 12 in this order.

Accordingly, the heat-transfer medium cooled by the radiator 12 transfers heat with the power conversion device 5, so that the power conversion device 5 is appropriately cooled. In addition, since the second pump EWP2 is disposed downstream of the radiator 12, it is possible to efficiently suppress heat generation caused by operation of the second pump EWP2. Moreover, since the second pump EWP2 can be used in a limited temperature range, a highly versatile pump can be used. Furthermore, by providing the buffer tank 15 downstream of the power conversion device 5 that generates a large amount of heat, it is possible to improve air bleeding efficiency.

On the other hand, in the series mode, the electromagnet 21 of the electrically-actuated three-way valve EWV is energized, so that the position of the valve body 20 is switched from the first position to the second position. At this time, the electrically-actuated three-way valve EWV shuts off the connection between the downstream-side flow path (the first port 17) of the second pump EWP2 and the upstream-side flow path (the second port 18) of the power conversion device 5 and allows connection between the downstream-side flow path (the first port 17) of the second pump EWP2 and the first connection path 8 (the third port 19) to be described later. Flow of the heat-transfer medium in the series mode will be described later.

[Connection Circuit]

The connection paths 8 and 9 include the first connection path 8 and a second connection path 9. The first connection path 8 connects the first connection portion 14a of the second temperature adjustment circuit 6 and a first connection portion 13a of the first temperature adjustment circuit 4. The second connection path 9 connects a second connection portion 14b of the second temperature adjustment circuit 6 and a second connection portion 13b of the first temperature adjustment circuit 4. The first connection portion 14a and the second connection portion 14b of the second temperature adjustment circuit 6 are located downstream of the electrically-actuated three-way valve EWV and upstream of the power conversion device 5 in the second temperature adjustment circuit 6. The first connection portion 13a of the first temperature adjustment circuit 4 is located downstream of the first pump EWP1 and upstream of the chiller 11 in the first temperature adjustment circuit 4. The second connection portion 13b of the first temperature adjustment circuit 4 is located downstream of the charger 3 and upstream of the electrically-actuated valve FSV in the first temperature adjustment circuit 4.

A path between the first connection portion 13a and the second connection portion 13b in the first temperature adjustment circuit 4, that is, a path in the first temperature adjustment circuit 4 where the first pump EWP1 and the electrically-actuated valve FSV are disposed functions as a branch path 16 that bypasses a part of the connection circuit 7.

Figure 3:
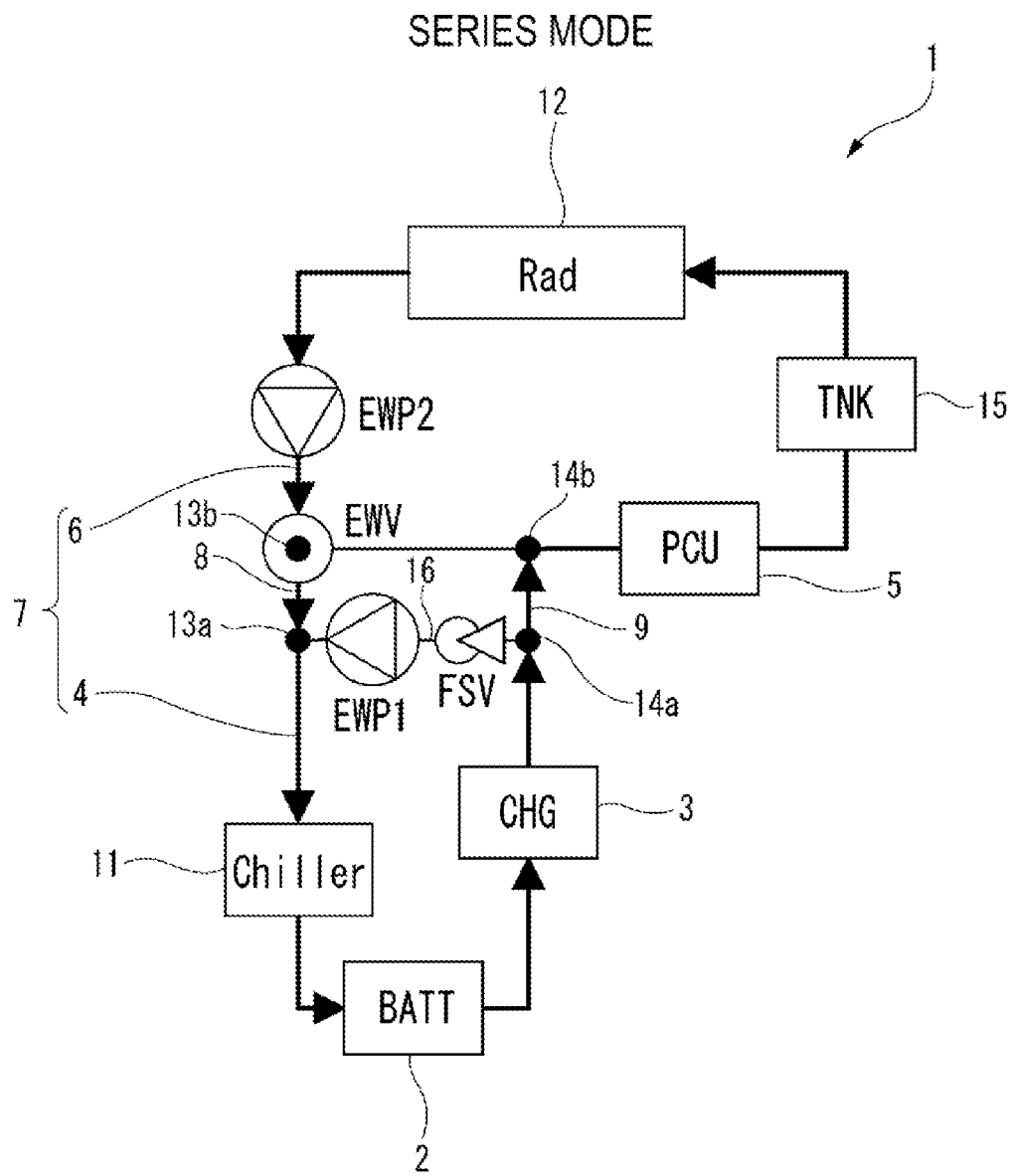
FIG. 3 is an illustrative diagram illustrating a flow of the heat-transfer medium in a series mode in the temperature adjustment circuit of FIG. 1.

As illustrated in FIG. 3, in the series mode, where the heat-transfer medium circulates through the connection circuit 7, the first pump EWP1 is stopped, and the heat-transfer medium is circulated by driving of the second pump EWP2. In the series mode, the electrically-actuated valve FSV is closed to stop the circulation of the heat-transfer medium passing through the branch path 16. Accordingly, the heat-transfer medium discharged from the second pump EWP2 circulates through the chiller 11, the battery 2, the charger 3, the power conversion device 5, the buffer tank 15, and the radiator 12 in this order, so that the battery 2, the charger 3, and the power conversion device 5 are cooled.

At this time, since the heat-transfer medium passing through the radiator 12 and the chiller 11 can flow to the battery 2 before flowing to the power conversion device 5, the battery 2 having a low management temperature can be preferentially cooled. Further, when a demand for cooling the battery 2 is high, a cooling capacity can be enhanced by using the chiller 11 and the radiator 12. On the other hand, when the cooling demand for the battery 2 is light, energy consumption can be reduced by using only the radiator 12.

Further, when the heat-transfer medium is circulated only by the second pump EWP2 in the series mode, pressure drop can be reduced since the heat-transfer medium is circulated without passing through the first pump EWP1. Further, in the series mode, since the first temperature adjustment circuit 4 and the second temperature adjustment circuit 6 are connected to each other via the connection paths 8 and 9, a pressure change or a flow rate change accompanying thermal expansion of the heat-transfer medium and the like in the two temperature adjustment circuits 4 and 6 can be absorbed by one buffer tank 15.

On the other hand, as illustrated in FIG. 2, in the separate mode, where the heat-transfer medium does not circulate through the connection circuit 7 but separately circulates through the first temperature adjustment circuit 4 and the second temperature adjustment circuit 6, the electrically-actuated valve FSV is set to a valve-open state, and the first pump EWP1 and the second pump EWP2 are driven. Accordingly, the heat-transfer medium is separately circulated through the temperature adjustment circuits 4 and 6, so that the cooling targets in each of the temperature adjustment circuits 4 and 6 are cooled.

Since the first temperature adjustment circuit 4 and the second temperature adjustment circuit 6 are connected via the second connection path 9 even in the separate mode, even if the heat-transfer medium in the first temperature adjustment circuit 4 thermally expands, a pressure change or flow rate change accompanying the thermal expansion can be absorbed by the buffer tank 15 in the second temperature adjustment circuit 6 that is connected via the second connection path 9.

[Control Device]

The control device 10 is configured to receive temperature information of the battery 2, the power conversion device 5, and the like and rotation speed information of the second pump EWP2 and the first pump EWP1 to control the first pump EWP1, the second pump EWP2, the electrically-actuated three-way valve EWV, and the electrically-actuated valve FSV based on determination according to the input information, thereby appropriately operating the temperature adjustment circuit 1.

When the temperature adjustment circuit 1 is switched from the separate mode to the series mode, the control device 10 set the electrically-actuated valve FSV in a valve-closed state, controls the electrically-actuated three-way valve EWV to supply the heat-transfer medium to the first connection path 8, and drives only the second pump EWP2. On the other hand, when the temperature adjustment circuit 1 is switched from the series mode to the separate mode, the electrically-actuated valve FSV is set to a valve-open state, the electrically-actuated three-way valve EWV is controlled to supply the heat-transfer medium to the second connection portion 14b of the second temperature adjustment circuit 6, and the first pump EWP1 and the second pump EWP2 are driven. As described above, according to the temperature adjustment circuit 1, by controlling the electrically-actuated three-way valve EWV and the electrically-actuated valve FSV to switch between the series mode and the separate mode, easy switching of the temperature adjustment circuit 1 can be achieved.

Figure 5:
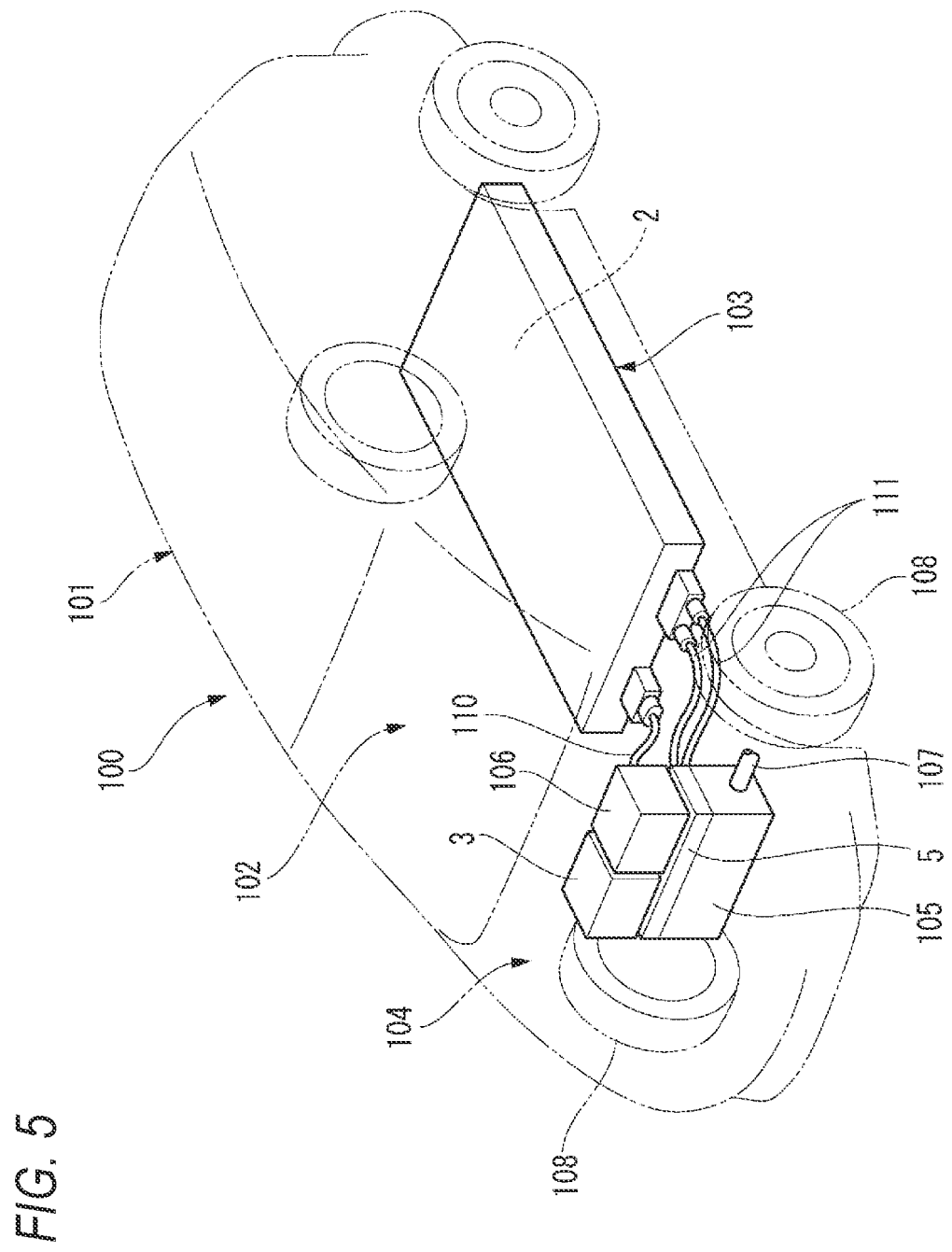
FIG. 5 is a perspective view illustrating a schematic configuration of an electric vehicle in which the temperature adjustment circuit of the present embodiment can be used.

FIG. 5 is a perspective view illustrating a schematic configuration of an electric vehicle 100 in which the temperature adjustment circuit 1 of the present embodiment can be used. Although the electric vehicle 100 may be an electric vehicle or a fuel cell vehicle having only an electric motor as a driving source or a hybrid vehicle having an electric motor and an internal combustion engine, an electric vehicle is taken as an example in the following.

A battery case 103 that houses the battery 2 in a portion under a floor of a vehicle interior 102 is mounted on a vehicle body 101 of the electric vehicle 100. A motor room 104 is provided in a front portion of the electric vehicle 100. The motor 105, the power conversion device 5, a branch unit 106, the charger 3, and the like are provided in the motor room 104.

Rotational driving force of the motor 105 is configured to be transmitted to a shaft 107. Front wheels 108 of the electric vehicle 100 are connected to both ends of the shaft 107. The power conversion device 5 is disposed on an upper side of the motor 105 and is directly fastened and fixed to a case of the motor 105. The power conversion device 5 is electrically connected to a connector of the battery case 103 by a power cable 111. In addition, the power conversion device 5 is electrically connected to the motor 105 by, for example, a three-phase bus bar. The power conversion device 5 drives and controls the motor 105 with power supplied from the battery 2.

The branch unit 106 and the charger 3 are arranged side by side in a left-right direction. The branch unit 106 and the charger 3 are disposed above the power conversion device 5. The branch unit 106 and the charger 3 are disposed in a state of being separated from the power conversion device 5. The branch unit 106 and the battery case 103 are electrically connected by a cable 110 having connectors at both ends.

The branch unit 106 is electrically connected to the charger 3. The charger 3 is configured to be connected to a general external power supply such as a power outlet to charge the battery 2. The charger 3 and the branch unit 106 are electrically connected by a cable (not illustrated) having connectors at both ends.

Although an embodiment of the present invention has been described above, the present invention is not limited to the above-described embodiment, and modifications, improvements, and the like can be made as appropriate. For example, although the charger 3 is cooled by the first temperature adjustment circuit 4 in the above-described embodiment, the charger 3 may be cooled by the second temperature adjustment circuit 6. In this way, the battery 2 and the charger 3 can be cooled separately, and thus it is possible to only cool the battery 2 preferentially.

In addition, although the buffer tank 15 is disposed downstream of the power conversion device 5 and upstream of the radiator 12 in the embodiment described above, the buffer tank 15 may be disposed downstream of the radiator 12 and upstream of the second pump EWP2. Since the buffer tank 15 is provided downstream of the radiator 12 in which a temperature of the heat-transfer medium is low, requirement for heat resistance of the buffer tank 15 can be lowered. In addition, when the heat-transfer medium is injected from the buffer tank 15, injecting time of the heat-transfer medium can be shortened since the second pump EWP2 is located downstream of the buffer tank 15.

At least the following matters are described in the present specification. Although corresponding components or the like in the above embodiment are shown in parentheses, the present disclosure is not limited thereto.

(1) A temperature adjustment circuit (temperature adjustment circuit 1) includes:
  a first temperature adjustment circuit (first temperature adjustment circuit 4) that includes:
    a first pump (first pump EWP1) that is configured to supply a heat-transfer medium to a first cooling target (battery 2) and
    a first heat exchanging part (chiller 11) that transfers heat between the heat-transfer medium and an air-conditioning refrigerant;
  a second temperature adjustment circuit (second temperature adjustment circuit 6) that includes:
    a second pump (second pump EWP2) that is configured to supply the heat-transfer medium to a second cooling target (power conversion device 5) and
    a second heat exchanging part (radiator 12) that transfers heat between the heat-transfer medium and outside air;
  a first connection path (first connection path 8) that connects a first connection portion (first connection portion 13a) of the first temperature adjustment circuit and a first connection portion (14a) of the second temperature adjustment circuit;
  a second connection path (second connection path 9) that connects a second connection portion (second connection portion 13b) of the first temperature adjustment circuit and a second connection portion (second connection portion 14b) of the second temperature adjustment circuit;
  a three-way valve (electrically-actuated three-way valve EWV) that is provided in the first connection portion of the second temperature adjustment circuit and is configured to switch between supply of the heat-transfer medium to the second connection portion of the second temperature adjustment circuit and supply of the heat-transfer medium to the first connection path;
  a shut-off valve (electrically-actuated valve FSV) that is provided between the first connection portion of the first temperature adjustment circuit and the second connection portion of the first temperature adjustment circuit; and
  a control device (control device 10) that is configured to control the three-way valve and the shut-off valve,
  in which the control device is configured to switch between
    a circulation state where the shut-off valve is set to a valve-closed state and the three-way valve is controlled to supply the heat-transfer medium to the first connection path so that the heat-transfer medium is circulated through a connection circuit (connection circuit 7) in which the first temperature adjustment circuit and the second temperature adjustment circuit are connected to each other and
    a non-circulation state where the shut-off valve is set to a valve-open state and the three-way valve is controlled to supply the heat-transfer medium to the second connection portion of the second temperature adjustment circuit so that the heat-transfer medium is not circulated through the connection circuit.

According to (1), by controlling the three-way valve and the shut-off valve to switch between the circulation state and the non-circulation state, easy switching of the temperature adjustment circuit can be achieved. In addition, since the first temperature adjustment circuit and the second temperature adjustment circuit are connected by the second connection path regardless of the circulation state or the non-circulation state, even if the heat-transfer medium expands, it is sufficient that one buffer tank (reserve tank) is provided in the temperature adjustment circuit, so that the number of components can be reduced.

(2) The temperature adjustment circuit according to (1), in which the first cooling target is a battery (battery 2),
in which the second cooling target is a power conversion device (power conversion device 5), and
in which, in the circulation state, the heat-transfer medium flows through the second cooling target, the second heat exchanging part, the first heat exchanging part, and the first cooling target in this order.

According to (2), since the heat-transfer medium passing through the second heat exchanging part and the first heat exchanging part can flow to the battery before flowing to the power conversion device, the battery having a low management temperature can be preferentially cooled. In addition, when a demand for cooling the battery is high, a cooling capacity can be enhanced by using the first heat exchanging part and the second heat exchanging part. On the other hand, when the demand for cooling the battery is low, energy consumption can be reduced by using only the first heat exchanging part or the second heat exchanging part.

(3) The temperature adjustment circuit according to (2), in which the first temperature adjustment circuit further includes a charge (charger 3).

According to (3), since the battery and the charger can be cooled simultaneously, it is possible to efficiently cool the battery and the charger that generate heat during charging. In addition, the battery and the charger can be disposed close to each other, so that a cooling pipe can be shortened.

(4) The temperature adjustment circuit according to (2), in which the second temperature adjustment circuit further includes a charger.

According to (4), it is possible to cool the battery and the charger separately, so that it is possible to cool only the battery preferentially.

(5) The temperature adjustment circuit according to any one of (2) to (4),
in which the second temperature adjustment circuit further includes a buffer tank (buffer tank 15) that is disposed downstream of the second cooling target and upstream of the second heat exchanging part in a flow direction of the heat-transfer medium in the second temperature adjustment circuit in the non-circulation state.

According to (5), air bleeding efficiency can be improved by providing the buffer tank downstream of the power conversion device that generates a large amount of heat.

(6) The temperature adjustment circuit according to any one of (2) to (4),
in which the second temperature adjustment circuit further includes a buffer tank (buffer tank 15) that is disposed downstream of the second heat exchanging part and upstream of the second pump in a flow direction of the heat-transfer medium in the second temperature adjustment circuit in the non-circulation state.

According to (6), requirement for heat resistance of the buffer tank can be lowered since the buffer tank is provided downstream of the second heat exchanging part in which a temperature of the heat-transfer medium is low. In addition, when the heat-transfer medium is injected from the buffer tank, injecting time of the heat-transfer medium can be shortened since the second pump is located downstream of the buffer tank.

(7) The temperature adjustment circuit according to any one of (1) to (6),
in which, in the second temperature adjustment circuit, the second pump is disposed downstream of the second heat exchanging part and upstream of the three-way valve in a flow direction of the heat-transfer medium in the second temperature adjustment circuit in the non-circulation state.

According to (7), since the second pump is disposed downstream of the second heat exchanging part, it is possible to efficiently suppress heat generation accompanying operation of the second pump. In addition, since the second pump can be used in a limited temperature range, a highly versatile second pump can be used.

(8) The temperature adjustment circuit according to any one of (1) to (7),
in which, in the first temperature adjustment circuit, the first pump, the first heat exchanging part, and the first cooling target are arranged in this order in a flow direction of the heat-transfer medium in the first temperature adjustment circuit in the non-circulation state.

According to (8), the heat-transfer medium can be supplied from the first heat exchanging part to the first cooling target without being affected by heat of the first pump.

(9) The temperature adjustment circuit according to any one of (1) to (8),
in which, in the first temperature adjustment circuit, the first pump is disposed between the second connection portion of the first temperature adjustment circuit and the first connection portion of the first temperature adjustment circuit in a flow direction of the heat-transfer medium in the first temperature adjustment circuit in the non-circulation state.

According to (9), when the heat-transfer medium is circulated only by the second pump in the circulation state, pressure loss can be reduced since the heat-transfer medium is circulated without passing through the first pump.

REFERENCE SIGNS LIST 1 temperature adjustment circuit
2 battery (first cooling target)
3 charger
4 first temperature adjustment circuit
5 power conversion device (second cooling target)
6 second temperature adjustment circuit
7 connection circuit
8 first connection path
9 second connection path
10 control device
11 chiller (first heat exchanging part)
12 radiator (second heat exchanging part)
13a first connection portion of first temperature adjustment circuit
13b second connection portion of first temperature adjustment circuit
14a first connection portion of second temperature adjustment circuit
14b second connection portion of second temperature adjustment circuit
15 buffer tank
EWP1 first pump
EWP2 second pump
EWV electrically-actuated three-way valve (three-way valve)
FSV electrically-actuated valve (shut-off valve)

The invention claimed is:
1. A temperature adjustment circuit comprising:
a first temperature adjustment circuit that includes:
a first pump that is configured to supply a heat-transfer medium to a first cooling target and
a first heat exchanging part that transfers heat between the heat-transfer medium and an air-conditioning refrigerant;
a second temperature adjustment circuit that includes:
a second pump that is configured to supply the heat-transfer medium to a second cooling target and a second heat exchanging part that transfers heat between the heat-transfer medium and outside air;
a first connection path that connects a first connection portion of the first temperature adjustment circuit and a first connection portion of the second temperature adjustment circuit;
a second connection path that connects a second connection portion of the first temperature adjustment circuit and a second connection portion of the second temperature adjustment circuit;
a three-way valve that is provided in the first connection portion of the second temperature adjustment circuit and is configured to switch between supply of the heat-transfer medium to the second connection portion of the second temperature adjustment circuit and supply of the heat-transfer medium to the first connection path;
a shut-off valve that is provided between the first connection portion of the first temperature adjustment circuit and the second connection portion of the first temperature adjustment circuit; and
a control device that is configured to control the three-way valve and the shut-off valve,
wherein the control device is configured to switch between
a circulation state where the shut-off valve is set to a valve-closed state and the three-way valve is controlled to supply the heat-transfer medium to the first connection path so that the heat-transfer medium is circulated through a connection circuit in which the first temperature adjustment circuit and the second temperature adjustment circuit are connected to each other and
a non-circulation state where the shut-off valve is set to a valve-open state and the three-way valve is controlled to supply the heat-transfer medium to the second connection portion of the second temperature adjustment circuit so that the heat-transfer medium is not circulated through the connection circuit.

2. The temperature adjustment circuit according to claim 1, wherein
the first cooling target is a battery,
the second cooling target is a power conversion device, and,
in the circulation state, the heat-transfer medium flows through the second cooling target, the second heat exchanging part, the first heat exchanging part, and the first cooling target in this order.

3. The temperature adjustment circuit according to claim 2,
wherein the first temperature adjustment circuit further includes a charger.

4. The temperature adjustment circuit according to claim 2,
wherein the second temperature adjustment circuit further includes a charger.

5. The temperature adjustment circuit according to claim 2,
wherein the second temperature adjustment circuit further includes a buffer tank that is disposed downstream of the second cooling target and upstream of the second heat exchanging part in a flow direction of the heat-transfer medium in the second temperature adjustment circuit in the non-circulation state.

6. The temperature adjustment circuit according to claim 2,
wherein the second temperature adjustment circuit further includes a buffer tank that is disposed downstream of the second heat exchanging part and upstream of the second pump in a flow direction of the heat-transfer medium in the second temperature adjustment circuit in the non-circulation state.

7. The temperature adjustment circuit according to claim 1,
wherein, in the second temperature adjustment circuit, the second pump is disposed downstream of the second heat exchanging part and upstream of the three-way valve in a flow direction of the heat-transfer medium in the second temperature adjustment circuit in the non-circulation state.

8. The temperature adjustment circuit according to claim 1,
wherein, in the first temperature adjustment circuit, the first pump, the first heat exchanging part, and the first cooling target are arranged in this order in a flow direction of the heat-transfer medium in the first temperature adjustment circuit in the non-circulation state.

9. The temperature adjustment circuit according to claim 1,
wherein, in the first temperature adjustment circuit, the first pump is disposed between the second connection portion of the first temperature adjustment circuit and the first connection portion of the first temperature adjustment circuit in a flow direction of the heat-transfer medium in the first temperature adjustment circuit in the non-circulation state.

* * * * *